United States Patent
Childs et al.

(10) Patent No.: US 8,797,132 B2
(45) Date of Patent: Aug. 5, 2014

(54) ACCESSORY FOR A MOBILE ELECTRONIC DEVICE AND METHOD OF PROVIDING AND USING THE SAME

(71) Applicant: Belkin International, Inc., Playa Vista, CA (US)

(72) Inventors: Jacob Scott Childs, Venice, CA (US); Barry P. Sween, Santa Monica, CA (US); Justin Jakobson, Venice, CA (US)

(73) Assignee: Belkin International, Inc., Playa Vista, CA (US)

( * ) Notice: Subject to any disclaimer, the term of this patent is extended or adjusted under 35 U.S.C. 154(b) by 33 days.

(21) Appl. No.: 13/655,317

(22) Filed: Oct. 18, 2012

(65) Prior Publication Data

US 2013/0093304 A1  Apr. 18, 2013

Related U.S. Application Data

(60) Provisional application No. 61/548,702, filed on Oct. 18, 2011.

(51) Int. Cl.
| | |
|---|---|
| *H01F 7/00* | (2006.01) |
| *H01F 1/00* | (2006.01) |
| *A47B 85/00* | (2006.01) |
| *B65D 85/00* | (2006.01) |
| *A45C 11/00* | (2006.01) |

(52) U.S. Cl.
CPC .................................. *A45C 11/00* (2013.01)
USPC ............................ 335/219; 312/240; 206/320

(58) Field of Classification Search
CPC .......................... A45C 11/00; A45C 2011/003
USPC ............................ 335/219; 312/240; 206/320
See application file for complete search history.

(56) References Cited

U.S. PATENT DOCUMENTS

| | | | | |
|---|---|---|---|---|
| 1,613,536 | A  * | 1/1927  | Rose  | 132/315 |
| 7,735,644 | B2 * | 6/2010  | Sirichai et al. | 206/320 |
| 8,245,843 | B1 * | 8/2012  | Wu | 206/320 |
| 2003/0034263 | A1* | 2/2003  | D'Hoste | 206/320 |
| 2008/0302687 | A1* | 12/2008 | Sirichai et al. | 206/320 |
| 2009/0159763 | A1* | 6/2009  | Kim | 248/174 |
| 2011/0266194 | A1* | 11/2011 | Bau | 206/736 |
| 2011/0290687 | A1* | 12/2011 | Han | 206/320 |
| 2012/0194448 | A1* | 8/2012  | Rothkopf | 345/173 |
| 2012/0211377 | A1* | 8/2012  | Sajid | 206/216 |
| 2012/0308981 | A1* | 12/2012 | Libin et al. | 434/362 |
| 2013/0020216 | A1* | 1/2013  | Chiou | 206/320 |

* cited by examiner

*Primary Examiner* — Mohamad Musleh
(74) *Attorney, Agent, or Firm* — Bryan Cave LLP

(57) ABSTRACT

Some embodiments include an accessory for a mobile electronic device. Other embodiments of related accessories and methods are also disclosed.

20 Claims, 7 Drawing Sheets

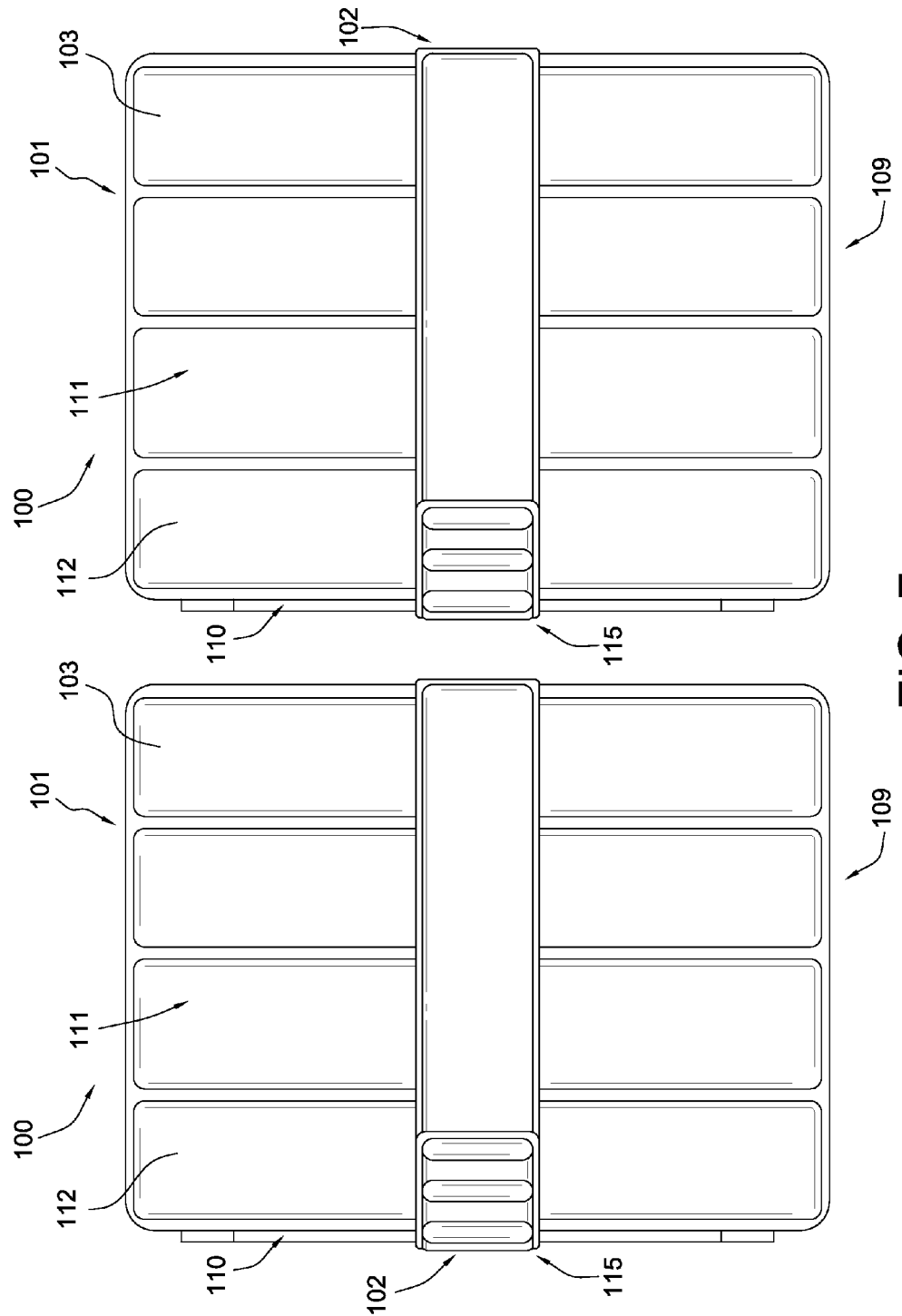

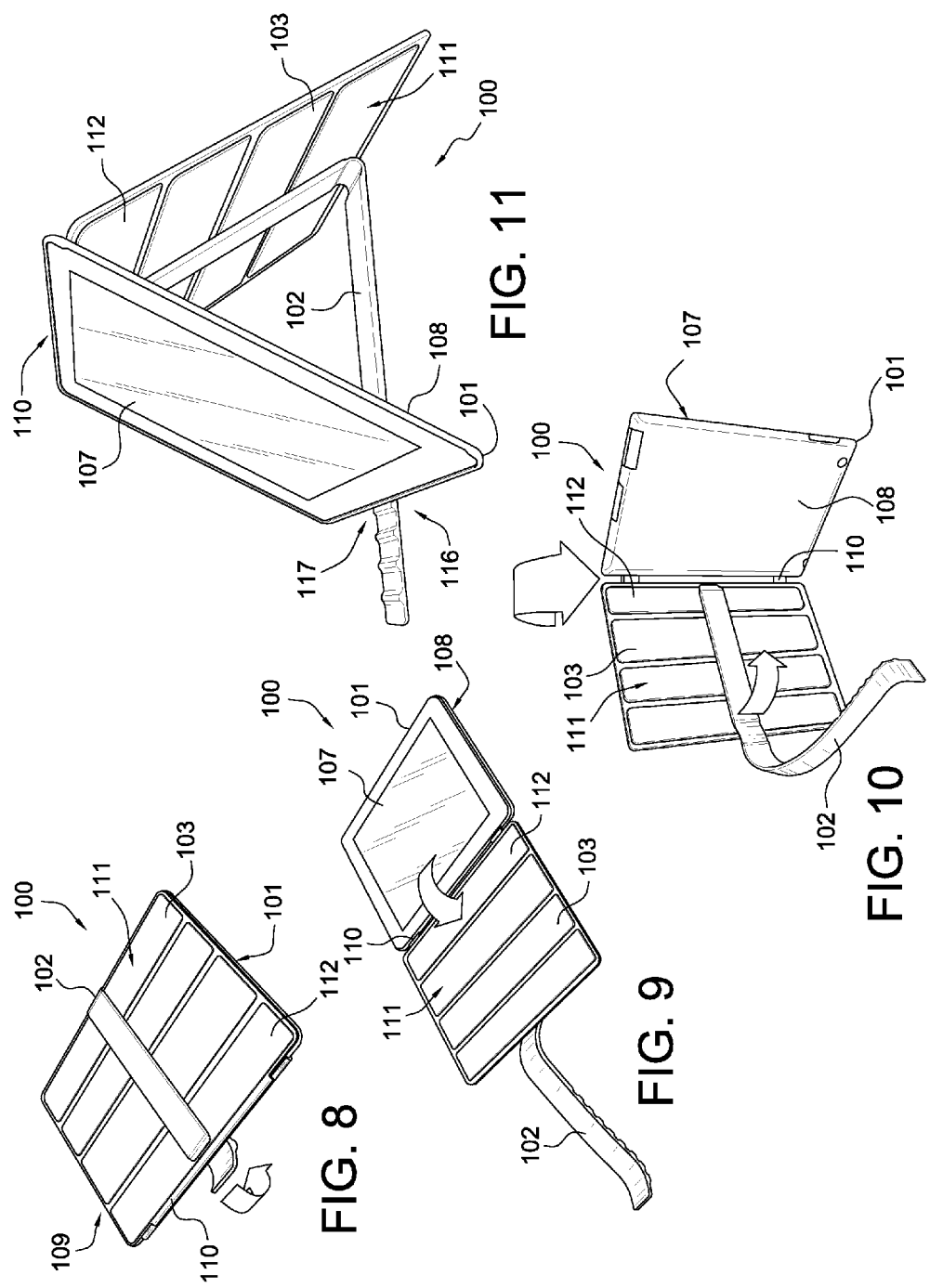

ACCESSORY FOR A MOBILE ELECTRONIC DEVICE AND METHOD OF PROVIDING AND USING THE SAME

CROSS-REFERENCE TO RELATED APPLICATIONS

This application claims the benefit of U.S. Provisional Application No. 61/548,702, filed Oct. 18, 2011. U.S. Provisional Application No. 61/548,702 is incorporated herein by reference in its entirety.

FIELD OF THE INVENTION

This invention relates generally to accessories for mobile electronic devices, and relates more particularly to such accessories that permit mobile electronic devices to be positioned at one or more predetermined viewing angles and methods of providing and using the same.

DESCRIPTION OF THE BACKGROUND

Mobile electronic devices, which typically have a planar form factor, may not be able to maintain one or more positions in the absence of external support even though it may be desirable to position the mobile electronic devices in those positions. Nonetheless, it may not be desirable to hold the mobile electronic devices during use, such as, for example, when watching movies or reading electronic books via the mobile electronic devices. Accordingly, a need or potential for benefit exists for accessories that permit mobile electronic devices to be positioned at one or more predetermined viewing angles.

BRIEF DESCRIPTION OF THE DRAWINGS

To facilitate further description of the embodiments, the following drawings are provided in which:

FIG. 7 illustrates a first one of the accessory of FIG. 1 and a second one of the accessory of FIG. 1, according to the embodiment of FIG. 1;

FIG. 8 illustrates another perspective view of the accessory of FIG. 1 when the accessory is coupled to the mobile electronic device of FIG. 1 and/or the cover mechanism of FIG. 1, according to the embodiment of FIG. 1;

FIG. 9 illustrates another perspective view of the accessory of FIG. 1 when the accessory is coupled to the mobile electronic device of FIG. 1 and/or the cover mechanism of FIG. 1, according to the embodiment of FIG. 1;

FIG. 10 illustrates another perspective view of the accessory of FIG. 1 when the accessory is coupled to the mobile electronic device of FIG. 1 and/or the cover mechanism of FIG. 1, according to the embodiment of FIG. 1;

FIG. 11 illustrates another perspective view of the accessory of FIG. 1 when the accessory is coupled to the mobile electronic device of FIG. 1 and/or the cover mechanism of FIG. 1, according to the embodiment of FIG. 1;

Figure 1:
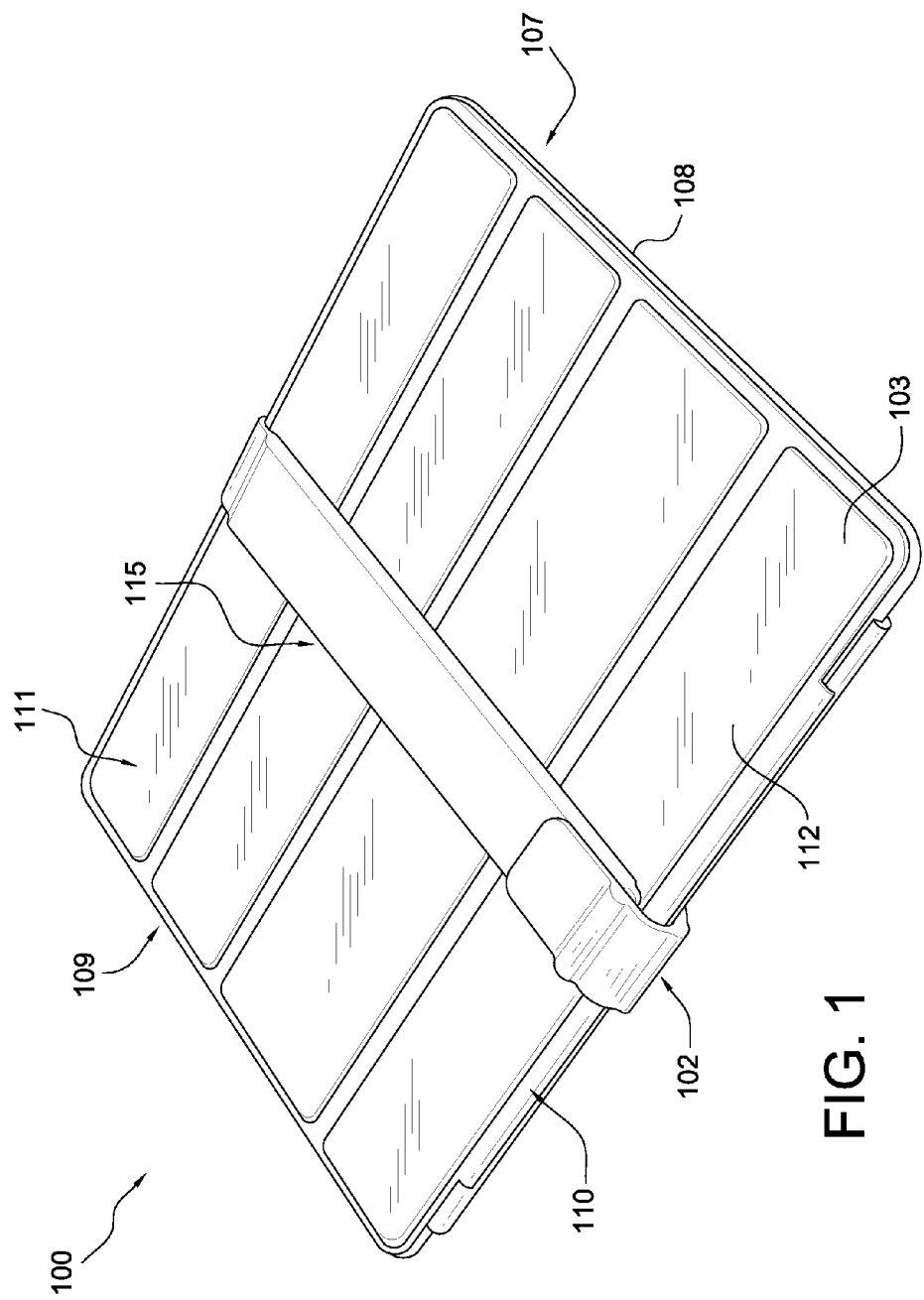
FIG. 1 illustrates a perspective view of an accessory for a mobile electronic device when the accessory is coupled to the mobile electronic device and/or a cover mechanism, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments include an accessory for a mobile electronic device. The accessory comprises a strap, and the strap comprises a first stabilization structure, a second stabilization structure, and one or more support elements. The mobile electronic device comprises a mobile electronic device display and a mobile electronic device exterior. The mobile electronic device can comprise a cover mechanism, and the cover mechanism can comprise a cover mechanism closed configuration. Meanwhile, the cover mechanism can be devoid of the mobile electronic device display and can be configured to be coupled to the mobile electronic device exterior and to conceal the mobile electronic device display when the cover mechanism is positioned in the cover mechanism closed configuration. Furthermore, the first stabilization structure can comprises a first coupling mechanism, and the first coupling mechanism can be configured to be coupled to the cover mechanism in order to couple the strap to the cover mechanism. Likewise, the one or more support elements can comprise a first support element, and the strap can comprise a strap closed configuration and one or more strap stand configurations. When the strap is positioned in the strap closed configuration and the cover mechanism is positioned in the cover mechanism closed configuration, the strap can be configured to maintain the cover mechanism in the cover mechanism closed configuration. Meanwhile, when the strap is positioned in the one or more strap stand configurations, the strap can provide a strap stand for the mobile electronic device.

Various embodiments include a method of providing an accessory for a mobile electronic device. The mobile electronic device comprises a mobile electronic device display and a mobile electronic device exterior. Meanwhile, the mobile electronic device can comprise a cover mechanism, and the cover mechanism can comprise a closed configuration. The cover mechanism can be devoid of the mobile electronic device display and can be configured to be coupled to the mobile electronic device exterior and to conceal the mobile electronic device display when the cover mechanism is positioned in the cover mechanism closed configuration. The method can comprise providing a strap comprising a first stabilization structure, a second stabilization structure, and one or more support elements. Meanwhile, providing the strap can comprise: providing the first stabilization structure such that the first stabilization structure comprises a first coupling mechanism configured to be coupled to the cover mechanism in order to couple the strap to the cover mechanism; providing the one or more support elements such that the one or more support elements comprise a first support element; and configuring the strap to comprise a strap closed configuration and one or more strap stand configurations such that (1) when the strap is positioned in the strap closed configuration and the cover mechanism is positioned in the cover mechanism closed configuration, the strap is configured to maintain the cover mechanism in the cover mechanism closed configuration and (2) when the strap is positioned in the one or more strap stand configurations, the strap provides a strap stand for the mobile electronic device.

Further embodiments include a method of using an accessory for a mobile electronic device. The mobile electronic device can comprise a mobile electronic device display and a mobile electronic device exterior. Likewise, the mobile electronic device can also comprise a cover mechanism, and the cover mechanism can comprise a cover mechanism closed configuration. Furthermore, the mobile electronic device can be devoid of the mobile electronic device display and can be configured to be coupled to the mobile electronic device exterior and to conceal the mobile electronic device display when the cover mechanism is positioned in the cover mechanism closed configuration. The method can comprise: coupling a strap to a cover mechanism of the mobile electronic device; and positioning the strap in a first strap stand configuration of the one or more strap stand configurations. The strap can comprise a first stabilization structure, a second stabilization structure, and one or more support elements. The first stabilization structure can comprise a first coupling mechanism configured to be coupled to the cover mechanism in order to couple the strap to the cover mechanism. The one or more support elements can comprise a first support element, and the strap can comprise a strap closed configuration and one or more strap stand configurations. When the strap is positioned in the strap closed configuration and the cover mechanism is positioned in the cover mechanism closed configuration, the strap can be configured to maintain the cover mechanism in the cover mechanism closed configuration, and when the strap is positioned in the one or more strap stand configurations, the strap provides a strap stand for the mobile electronic device.

Turning to the drawings, FIG. 1 illustrates a perspective view of accessory 100 for mobile electronic device 101 where accessory 100 is coupled to mobile electronic device 101 and/or cover mechanism 103, according to an embodiment. Accessory 100 is merely exemplary and is not limited to the embodiments presented herein. Accessory 100 can be employed in many different embodiments or examples not specifically depicted or described herein.

Referring to FIG. 1, accessory 100 can comprise strap 102. In some examples, strap 102 can be referred to as a band. In some embodiments, accessory 100 can comprise mobile electronic device 101. Meanwhile, in the same or different embodiments, accessory 100 and/or mobile electronic device 101 can comprise cover mechanism 103. Strap 102 comprises strap closed configuration 115 and one or more strap stand configurations, as described in further detail below.

In many embodiments, mobile electronic device 101 can comprise an electronic device configured to be sufficiently portable to be relocated by the user(s) of mobile electronic device 101 from one location to another without substantial difficulty. Accordingly, in various embodiments, mobile electronic device 101 can comprise at least one of a digital music player, a digital video player, a mobile telephone such as a smart mobile telephone, a personal digital assistant, a handheld digital computer such as a tablet computer system, a laptop computer system, or any other comparable and/or suitable electronic device. For example, mobile electrical device 101 can comprise the iPod® or iPhone® or iTouch® or iPad® or MacBook® product by Apple Inc. of Cupertino, Calif. Likewise, mobile electrical device 101 can comprise a Blackberry® product by Research in Motion (RIM) of Waterloo, Ontario, Canada, or a different product by a different manufacturer.

Mobile electronic device 101 comprises mobile electronic device display 107 (e.g., an electronic and/or touch screen display) and mobile electronic device exterior 108 (e.g., a rear surface and/or one or more side wall surfaces of mobile electronic device 101). In some embodiments, mobile electronic device 101 can comprise cover mechanism 103, and in other embodiments, cover mechanism 103 can be separate from mobile electronic device 103.

Cover mechanism 103 can comprise cover mechanism coupling mechanism 110. In many embodiments, cover mechanism 103 can comprise at least two cover mechanism panels 111 (e.g., four cover mechanism panels). Accordingly, at least two cover mechanism panels 111 can comprise first cover mechanism panel 112. Meanwhile, cover mechanism 103 can comprise cover mechanism closed configuration 109. In many embodiments, cover mechanism 103 can be devoid of mobile electronic device display 107.

Cover mechanism 103 is configured to be coupled to mobile electronic device exterior 108 and to conceal mobile electronic device display 107 when cover mechanism 103 is positioned in cover mechanism closed configuration 109. Accordingly, cover mechanism 103 is configured to provide protection to mobile electronic device 101 and/or mobile electronic device display 107 when cover mechanism 103 is positioned in cover mechanism closed configuration 109. For example, cover mechanism 103 can be configured to be coupled to mobile electronic device exterior 108 at cover mechanism coupling mechanism 110. Accordingly, cover mechanism coupling mechanism 110 can comprise one or more magnets configured to permit cover mechanism 103 to be coupled to mobile electronic device exterior 108.

Meanwhile, first cover mechanism panel 112 can be coupled to cover mechanism coupling mechanism 110, such as, for example, by a mechanical and/or living hinge. Likewise, each of at least two cover mechanism panels 111 can also be coupled to adjacent panels of at least two cover mechanism panels 111 such that cover mechanism 103 forms a contiguous or continuous structure. In many embodiments, at least two cover mechanism panels 111 can be positioned such that cover mechanism panels 111 can form a cover mechanism stand (not shown) for mobile electronic device 101, and cover mechanism 103 can comprise a cover mechanism stand configuration (not shown).

Furthermore, cover mechanism 103, at least two cover mechanism panels 111, and first cover mechanism 112 can comprise steel, aluminum, and/or any other suitable metal and/or magnetically-attractive material. In the same or other embodiments, cover mechanism 103, at least two cover mechanism panels 111, and first cover mechanism 112 can comprise any suitably rigid polymeric material. Meanwhile, cover mechanism 103 can comprise an outer surface configured to enclose at least two cover mechanism panels 111 and/or first cover mechanism panel 112. The outer surface can comprise any fabric, polymeric, leather, and/or synthetic leather material.

Figure 2:
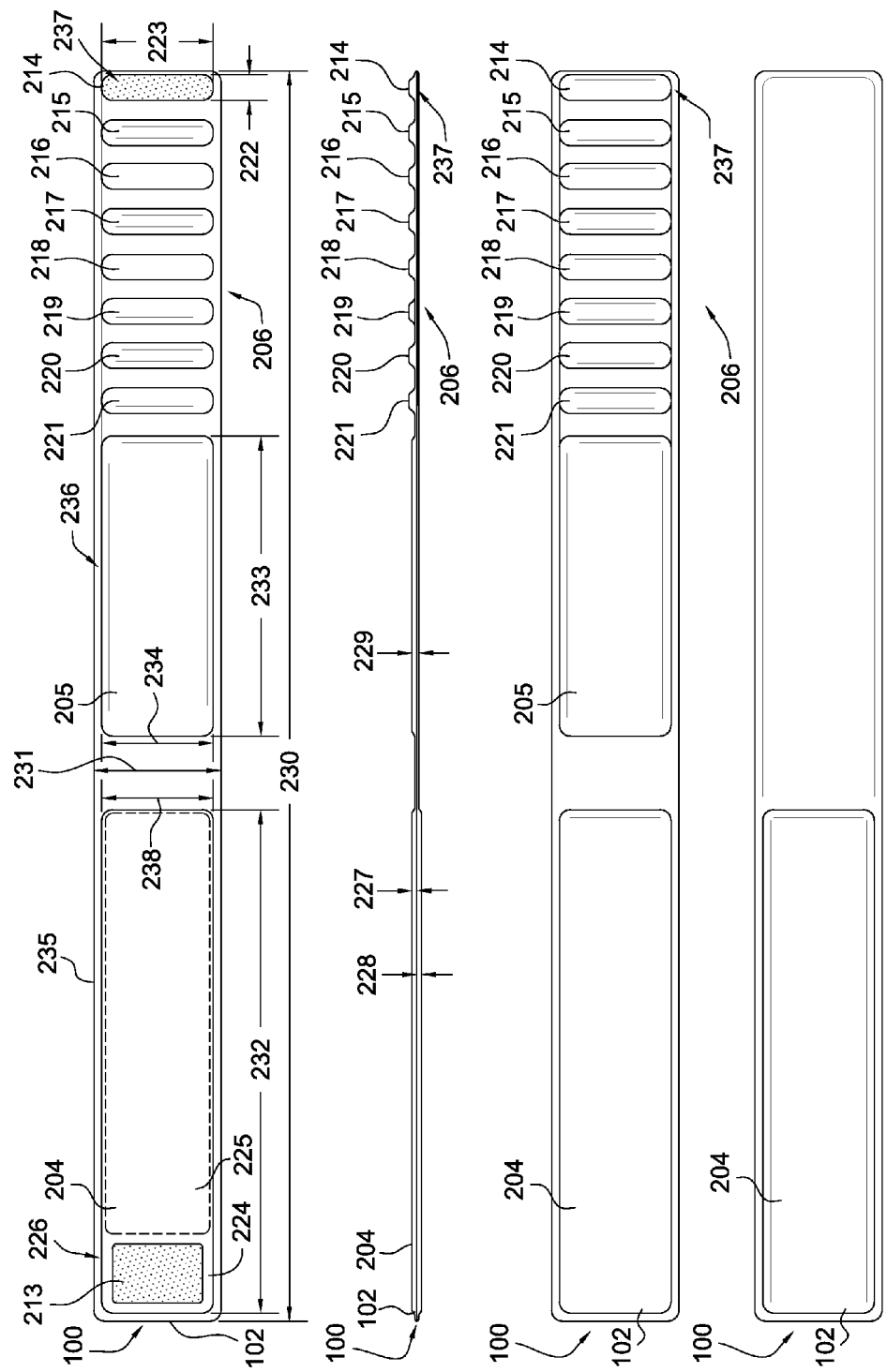
FIG. 2 illustrates various views of the accessory of FIG. 1 when a strap of the accessory is decoupled from the mobile electronic device of FIG. 1 and/or the cover mechanism of FIG. 1, according to the embodiment of FIG. 1.

Turning to the next drawing, FIG. 2 illustrates various views of accessory 100 when strap 102 is decoupled from mobile electronic device 101 (FIG. 1) and/or cover mechanism 103 (FIG. 1) in order to show various components of strap 102, according to the embodiment of FIG. 1. Referring to FIG. 2, strap 102 comprises first stabilization structure 204, second stabilization structure 205, and one or more support elements 206. In some embodiments, strap 102 can comprise strap perimeter 235 and/or strap perimeter region 236.

Figure 3:
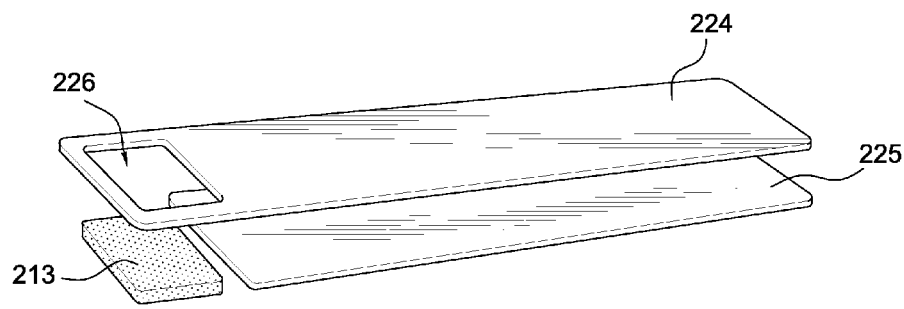
FIG. 3 illustrates an exploded view of a first stabilization structure of the strap of FIGS. 1 and 2, according to the embodiments of FIGS. 1 and 2.

Meanwhile, first stabilization structure 204 comprises first coupling mechanism 213. First stabilization structure 204 can also comprise first stabilization structure first element 224 and first stabilization structure second element 225. In some embodiments, first stabilization structure 204 can comprise first stabilization structure aperture 226. FIG. 3 illustrates an exploded view of first stabilization structure 204, according to the embodiments of FIGS. 1 and 2.

First stabilization structure first element 224 can comprise first stabilization structure first element thickness 227 (e.g., approximately 1 millimeter). In various embodiments, first stabilization structure first element thickness 227 can be greater than or equal to approximately 0.5 millimeters and can be less than or equal to approximately 1.5 millimeters. Meanwhile, first stabilization structure 204 and/or first stabilization structure first element 224 can comprise first stabilization structure length 232 (e.g., 170 millimeters) and/or first stabilization structure width 238 (e.g., 37 millimeters). In many embodiments, first stabilization structure first element 224 can comprise polycarbonate and/or any other suitable polymeric material.

Meanwhile, first stabilization structure second element 225 can comprise first stabilization structure second element thickness 228 (e.g., approximately 0.5 millimeters). In various embodiments, first stabilization structure second element thickness 228 can be greater than or equal to approximately 0.25 millimeters and less than or equal to approximately 0.75 millimeters. Meanwhile, first stabilization structure second element 225 can comprise a first stabilization structure second element length (e.g., approximately 133 millimeters) and/or a first stabilization structure second element width (e.g., approximately 37 millimeters). In many embodiments, first stabilization structure second element 225 can comprise steel, aluminum, and/or any other suitably rigid material.

First coupling mechanism 213 can be configured to be coupled (e.g., magnetically and/or mechanically) to cover mechanism 103 (FIG. 1) in order to couple strap 102 (FIG. 1) to cover mechanism 103. For example, first coupling mechanism 213 can be configured to be coupled to cover mechanism 103 (FIG. 1) at first coupling mechanism panel 112 (FIG. 1). Accordingly, first coupling mechanism 213 can comprise a first magnet. The first magnet can be configured to permit first coupling mechanism 213 to be magnetically coupled to cover mechanism 103 (FIG. 1). Meanwhile, first stabilization structure aperture 226 can be configured to receive first coupling mechanism 213 and to hold first coupling mechanism 213, as shown in FIGS. 2 and 3. In other embodiments, first coupling mechanism 213 can comprise a loop and hook fastener (e.g., Velcro® material) configured to be coupled to a corresponding loop and hook fastener located at cover mechanism 103 (FIG. 1).

Meanwhile, first stabilization structure 204 can also be configured to be coupled to one or more cover mechanism magnets of cover mechanism 103 (FIG. 1). The cover mechanism magnet(s) can be configured to couple cover mechanism 103 to mobile electronic device exterior 108 (FIG. 1) opposite to cover mechanism coupling mechanism 110 (FIG. 1).

First coupling mechanism 213 can comprise a first coupling mechanism width (e.g., approximately 30 millimeters) and a first coupling mechanism length (e.g., approximately 20 millimeters). Accordingly, first stabilization structure aperture 206 can also comprise a first stabilization structure aperture width (e.g., approximately 30 millimeters) and a first stabilization structure aperture length (e.g., approximately 20 millimeters) corresponding to the first coupling mechanism length and the first coupling mechanism width, respectively.

Meanwhile, first coupling mechanism 213 can comprise first coupling mechanism thickness (e.g., approximately 1.0-1.5 millimeters).

In some embodiments, first stabilization structure second element 225 can be coupled to first stabilization structure first element 224, and first stabilization structure aperture 206 can receive first coupling mechanism 213 such that first stabilization structure first element 224, first stabilization structure second element 225, and first coupling mechanism 213 form a substantially flush and/or smooth structure.

In various embodiments, second stabilization structure 205 can comprise second stabilization structure thickness 229 (e.g., approximately 1 millimeter). Second stabilization structure thickness 229 can be greater than or equal to approximately 0.5 millimeters and less than or equal to approximately 1.5 millimeters. Furthermore, second stabilization structure 205 can comprise second stabilization structure length 233 (e.g., approximately 100 millimeters) and/or second stabilization structure width 234 (e.g., approximately 37 millimeters). Second stabilization structure 205 can comprise polycarbonate and/or any suitable polymeric material. In many embodiments, second stabilization structure 205 and first stabilization structure first element 224 can comprise the same (e.g., polycarbonate) or different materials.

Support element(s) 206 comprise first support element 214. In various embodiments, first support element 214 can comprise second coupling mechanism 237. In many embodiments, support element(s) 206 can comprise two or more support elements. Accordingly, support element(s) 206 can also comprise second support element 215, third support element 216, fourth support element 217, fifth support element 218, sixth support element 219, seventh support element 220, and/or eighth support element 221.

In many embodiments, each of support element(s) 206 can comprise a recess configured to receive a portion (e.g., a side wall surface) of mobile electronic device 101 (FIG. 1). In other embodiments, each of support element(s) 206 can comprise a protuberance (e.g., a bump) configured to brace the portion of mobile electronic device 101 (FIG. 1).

Second coupling mechanism 237 can be configured to be coupled to first stabilization structure 204 when strap 102 is positioned in strap closed configuration 115 (FIG. 1) to maintain that strap 102 remains in strap closed configuration 115 (FIG. 1). Accordingly, second coupling mechanism 237 can be configured to be mechanically and/or magnetically coupled to first stabilization structure 204. For example, second coupling mechanism 237 can comprise a second magnet, a magnetically-attractive material, and/or a non-magnetically-attractive material, as applicable, configured to be coupled with first stabilization structure 204, first stabilization structure second element 225, and/or first coupling mechanism 213. In other examples, second coupling mechanism 237 can comprise a hook and loop fastener (e.g., Velcro®) material configured to be coupled to a corresponding hook and loop fastener located at first stabilization structure 204.

In many embodiments, each of support element(s) 206 can be separated (e.g., along strap length 230) by approximately 9 millimeters. In some embodiments, each of support element(s) 206 can be separated by greater than or equal to approximately 7 millimeters and less than or equal to approximately 11 millimeters. Meanwhile, each of support element(s) 206 can comprise support element length 222 (e.g., approximately 6 millimeters) and/or support element width 223 (e.g., approximately 37 millimeters). In various embodiments, support element length 222 can be greater than or equal to approximately 4 millimeters and less than or equal to approximately 8 millimeters. Likewise, support element width 223 can be greater than or equal to approximately 35 millimeters and less than or equal to approximately 39 millimeters.

In some embodiments, support element(s) 206 can comprise any suitable magnetically-attractive material (e.g., steel, etc.) and/or any suitable non-magnetically-attractive material (e.g., polycarbonate, aluminum, etc.).

In many embodiments, strap 102 (FIG. 1) can comprise strap length 230 (e.g., approximately 420 millimeters) and/or strap width 231 (e.g., approximately 42 millimeters). In various embodiments, first stabilization structure 204 can be separated (e.g., along strap length 230) from second stabilization structure 205 (e.g., by approximately 25 millimeters).

In some embodiments, strap perimeter region 236 can separate first stabilization structure 204, second stabilization structure 205, and support element(s) 206 from strap perimeter 235 (e.g., by approximately 2.5 millimeters). In further embodiments, strap perimeter region 236 can separate first stabilization structure 204, second stabilization structure 205, and support element(s) 206 from strap perimeter 235 by greater than or equal to approximately 1 millimeter and less than or equal to 5 millimeters. Likewise, strap 102, first stabilization structure 204, second stabilization structure 205, and/or support element(s) 206 can comprise beveled corners. Strap 102 can comprise beveled corners with a bevel radius of approximately 3 millimeters, and first stabilization structure 204, second stabilization structure 205, and/or support element(s) 206 can comprise beveled corners with a bevel radius of approximately 2 millimeters.

Strap 102 (FIG. 1) can comprise a strap outer surface material. The strap outer surface material can comprise polyurethane, micro-suede, neoprene, any suitable woven fabric, and/or any other suitable material configured to be able to enclose first stabilization structure 204, second stabilization structure 205, and support element(s) 206 while also being flexible to permit strap 102 (FIG. 1) to wrap around mobile electronic device 101 (FIG. 1) and/or cover mechanism 103 (FIG. 1).

Returning now to FIG. 1, when strap 102 is positioned in strap closed configuration 115 and cover mechanism is positioned in the cover mechanism closed configuration 109, strap 102 can be configured to maintain cover mechanism 103 in cover mechanism closed configuration 109. For example, when strap 102 is positioned in strap closed configuration 115, first coupling mechanism 213 (FIG. 2) can be coupled to cover mechanism 103 at first cover mechanism panel 112, and strap 102 can wrap around mobile electronic device 101 such that first support element 214 (FIG. 2) is positioned proximate to first stabilization structure 204 (FIG. 2). In a more detailed example, strap 102 can (a) run along cover mechanism 103 (and at least two cover mechanism panels 111, when applicable) such that first stabilization structure 204 (FIG. 2) couples to cover mechanism 103; (b) extend around mobile electronic device exterior 108; and (c) loop back to cover mechanism 103. In this configuration, second coupling mechanism 237 (FIG. 2) can be coupled to first stabilization structure 204 (FIG. 2) and/or first coupling mechanism 213 (FIG. 2) to hold cover mechanism 103 adjacent to mobile electronic device display 107 such that cover mechanism 103 does not move away from mobile electronic device display 107 (i.e., so that cover mechanism 103 provides protection to mobile electronic device display 107). Accordingly, strap 102 can advantageously prevent cover mechanism 103 from flopping loosely about cover mechanism coupling mechanism 110 and/or can better secure cover mechanism 103 to mobile electronic device 101 than cover mechanism magnet(s) can do alone.

Figure 15:
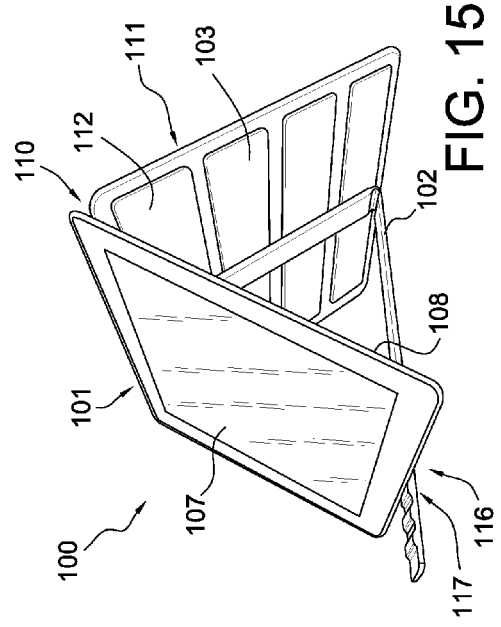
FIG. 15 illustrates another perspective view of the accessory of FIG. 1 when the accessory is coupled to the mobile electronic device of FIG. 1 and/or the cover mechanism of FIG. 1, according to the embodiment of FIG. 1.
Figure 13:
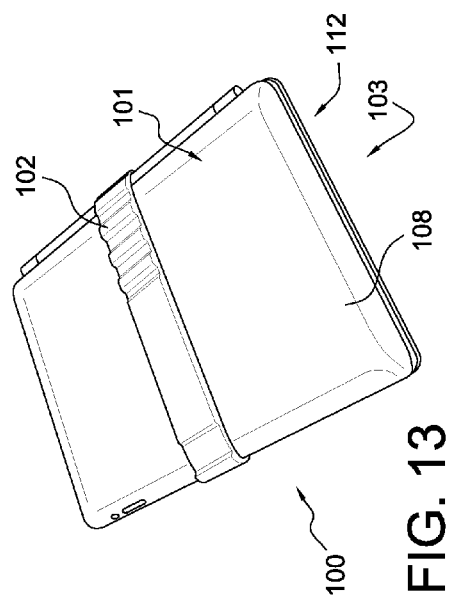
FIG. 13 illustrates another perspective view of the accessory of FIG. 1 when the accessory is coupled to the mobile electronic device of FIG. 1 and/or the cover mechanism of FIG. 1, according to the embodiment of FIG. 1.
Figure 12:
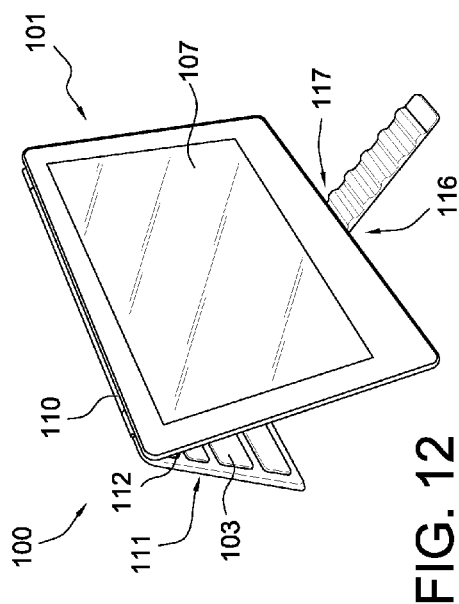
FIG. 12 illustrates another perspective view of the accessory of FIG. 1 when the accessory is coupled to the mobile electronic device of FIG. 1 and/or the cover mechanism of FIG. 1, according to the embodiment of FIG. 1.

Meanwhile, when strap 102 is positioned in one or more strap stand configurations 116 (FIGS. 11, 12, and 15), strap 102 can provide strap stand 117 (FIGS. 11, 12, and 15) for mobile electronic device 101. When strap 102 is positioned in strap stand configuration(s) 116 (FIGS. 11, 12, and 15), each support element of support element(s) 206 (FIG. 2) can operate to support mobile electronic device 101 at a different one of one or more predetermined and/or desired viewing angles, such as, for example, when accessory 100 is located on a surface top (e.g., a table top, etc.). Accordingly, strap stand configuration(s) 116 (FIGS. 11, 12, and 15) can comprise a different strap stand configuration (e.g., a first strap stand configuration, a second strap strand configuration, etc.) for each support element of support element(s) 206 (FIG. 2). Meanwhile, when strap 102 is positioned in strap stand configuration(s) 116 (FIGS. 11, 12, and 15), first stabilization structure 204 (FIG. 2) can also operate to prevent cover mechanism 103 from deforming such that cover mechanism 103 remains rigid and/or at least two cover mechanism panels 111 remain approximately parallel with each other. When cover mechanism 103 comprises at least two cover mechanism panels 111, because at least two cover mechanism panels 111 can be configured to fold to form the cover mechanism stand for mobile electronic device 101, strap 102 can thus operate as a backbone to cover mechanism 103.

In a more detailed example, second coupling mechanism 237 (FIG. 2) can be decoupled from first stabilization structure 213 (FIG. 2), and strap 102 can be unwrapped from around mobile electronic device exterior 108. Next, strap 102 can be moved along with cover mechanism 103 such that cover mechanism 103 is no longer in cover mechanism closed configuration 109. Then, cover mechanism 103 can be further rotated about cover mechanism coupling mechanism 110 toward mobile electronic device exterior 108 until mobile electronic device 101 and cover mechanism 103 form an A-frame. Meanwhile, strap 102 can remain coupled to cover mechanism 103, providing rigid support to cover mechanism 103 to prevent cover mechanism 103 from buckling between any of at least two cover mechanism panels 111. Likewise, strap 102 can be run underneath mobile electronic device 101 such that any one of support element(s) 206 (FIG. 2) support mobile electronic device 101 at a desired strap stand configuration (e.g., the first strap stand configuration) of strap stand configuration(s) 116 to achieve a desired and/or predetermined viewing angle of mobile electronic device 101, and accessory 100 can be placed on a surface top (e.g., a table top, etc.) for use.

Skipping ahead in the drawings, FIG. 7 illustrates a first one of accessory 100 and a second one of accessory 100, according to the embodiment of FIG. 1. Meanwhile, FIGS. 8-15 illustrate additional perspective views of accessory 100 coupled to mobile electronic device 101 and/or cover mechanism 103, according to the embodiment of FIG. 1.

Figure 4:
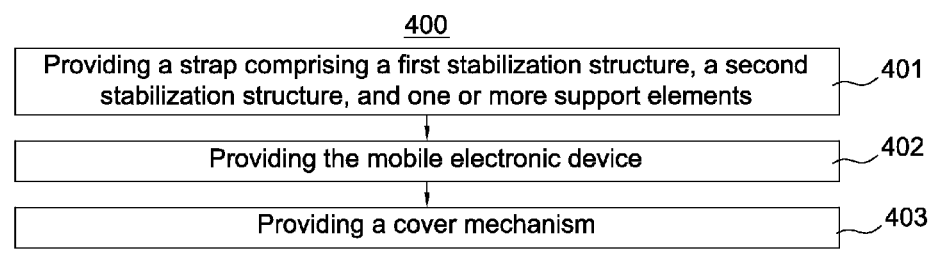
FIG. 4 illustrates a flow chart for an embodiment of a method of providing an accessory for a mobile electronic device.

Turning again to the drawings, FIG. 4 illustrates a flow chart for an embodiment of method 400 of providing an accessory for a mobile electronic device. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of the method 400 can be performed in any other suitable order. In still other embodiments, one or more of the procedures, the processes, and/or the activities in method 400 can be combined or skipped. In many embodiments, the accessory can be similar or identical to accessory 100 (FIG. 1), and the mobile electronic device can be similar or identical to mobile electronic device 101 (FIG. 1).

Figure 5:
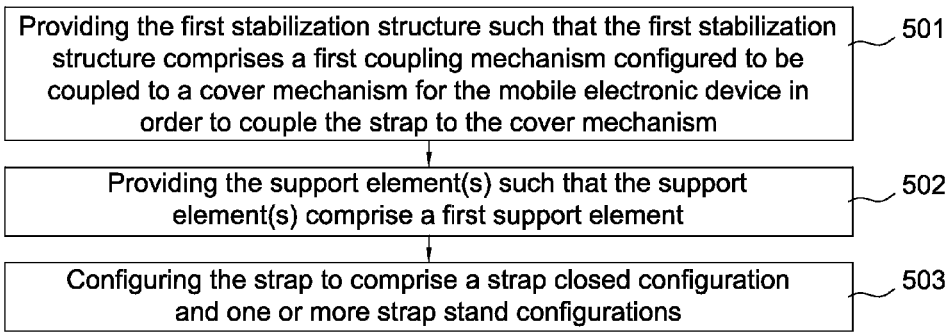
FIG. 5 illustrates an exemplary procedure of providing a strap, according to the embodiment of FIG. 4.

Referring to FIG. 1, method 400 can comprise procedure 401 of providing a strap comprising a first stabilization structure, a second stabilization structure, and one or more support elements. The strap can be similar to strap 102 (FIG. 1). For example, the first stabilization structure can be similar or identical to first stabilization structure 204 (FIG. 2), the second stabilization structure can be similar or identical to second stabilization structure 205 (FIG. 2), and/or the support element(s) can be similar or identical to support element(s) 206 (FIG. 2). FIG. 5 illustrates an exemplary procedure 401 of providing the strap, according to the embodiment of FIG. 4.

Referring to FIG. 5, procedure 401 can comprise process 501 of providing the first stabilization structure such that the first stabilization structure comprises a first coupling mechanism configured to be coupled to a cover mechanism for the mobile electronic device in order to couple the strap to the cover mechanism. The first coupling mechanism can be similar or identical to first coupling mechanism 213 (FIG. 2).

Procedure 401 can comprise process 502 of providing the support element(s) such that the support element(s) comprise a first support element. The first support element can be similar or identical to support element 214 (FIG. 2).

Procedure 401 can comprise process 503 of configuring the strap to comprise a strap closed configuration and one or more strap stand configurations. The strap closed configuration can be similar or identical to strap closed configuration 115 (FIG. 1), and the strap stand configuration(s) can be similar to strap stand configuration(s) 116 (FIG. 1).

Returning now to FIG. 4, method 400 can comprise procedure 402 of providing the mobile electronic device, and method 400 can also comprise procedure 403 of providing a cover mechanism. The cover mechanism can be similar or identical to cover mechanism can be similar or identical to cover mechanism 103 (FIG. 1).

Figure 6:
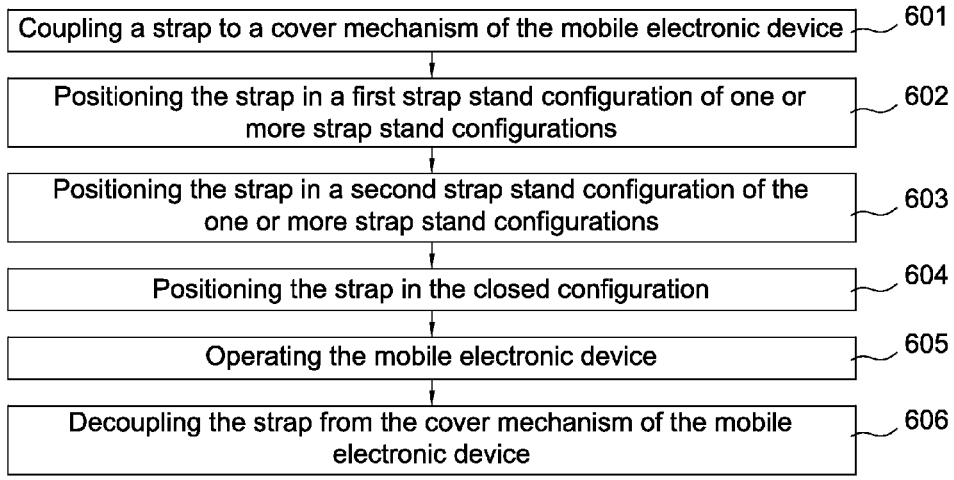
FIG. 6 illustrates a flow chart for an embodiment of a method of using an accessory for a mobile electronic device.
Figure 14:
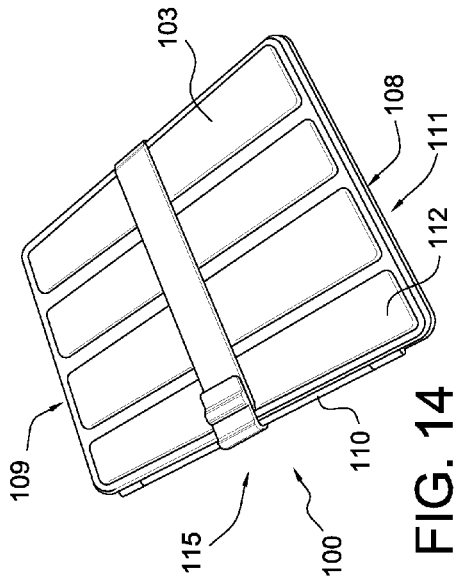
FIG. 14 illustrates another perspective view of the accessory of FIG. 1 when the accessory is coupled to the mobile electronic device of FIG. 1 and/or the cover mechanism of FIG. 1, according to the embodiment of FIG. 1.

Skipping ahead again in the drawings, FIG. 6 illustrates a flow chart for an embodiment of method 600 of using an accessory for a mobile electronic device. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of the method 600 can be performed in any other suitable order. In still other embodiments, one or more of the procedures, the processes, and/or the activities in method 600 can be combined or skipped. The accessory can be similar or identical to accessory 100 (FIG. 1), and the mobile electronic device can be similar or identical to mobile electronic device accessory 101 (FIG. 1).

Referring to FIG. 6, method 600 can comprise procedure 601 of coupling a strap to a cover mechanism of the mobile electronic device. The strap can be similar or identical to strap 102 (FIG. 1), and the cover mechanism can be similar or identical to cover mechanism 103 (FIG. 1). In many embodiments, procedure 601 can be performed before one or more of procedures 602 through 606.

Method 600 can comprise procedure 602 of positioning the strap in a first strap stand configuration of one or more strap stand configurations. The one or more strap stand configurations can be similar or identical to strap stand configuration(s) 116 (FIG. 1).

Method 600 can comprise procedure 603 of positioning the strap in a second strap stand configuration of the one or more strap stand configurations. In some embodiments, procedure 602 can be performed before procedure 603, and vice versa.

Method 600 can comprise procedure 604 of positioning the strap in the closed configuration. The closed configuration can be similar or identical to closed configuration 115 (FIG. 1).

Method 600 can comprise procedure 605 of operating the mobile electronic device. In many embodiments, procedure 605 can be performed after one or more of procedures 602, 603, and/or 604. Procedure 605 can be performed while the strap remains in the first or second strap stand configuration and before procedure 604.

Method 600 can comprise procedure 606 of decoupling the strap from the cover mechanism of the mobile electronic device. In various embodiments, procedure 606 can be performed after procedure 601.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that procedures 401 through 403 of FIG. 4, processes 501 through 503 of FIG. 5, and/or procedures 601 through 606 of FIG. 6 may be comprised of many different procedures, processes, and activities and be performed by many different modules, in many different orders, that any element of FIGS. 1-15 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An accessory for a mobile electronic device, the accessory comprising:
a strap comprising a first stabilization structure, a second stabilization structure, and one or more support elements;
wherein:
the mobile electronic device comprises a mobile electronic device display, a mobile electronic device exterior, and a cover mechanism comprising a cover mechanism closed configuration;
the cover mechanism is devoid of the mobile electronic device display and is configured to be coupled to the mobile electronic device exterior and to conceal the mobile electronic device display when the cover mechanism is positioned in the cover mechanism closed configuration;
the first stabilization structure comprises a first coupling mechanism configured to be coupled to the cover mechanism in order to couple the strap to the cover mechanism;
the one or more support elements comprise a first support element;
the strap comprises a strap closed configuration and one or more strap stand configurations;
when the strap is positioned in the strap closed configuration and the cover mechanism is positioned in the cover mechanism closed configuration, the strap is configured to maintain the cover mechanism in the cover mechanism closed configuration; and
when the strap is positioned in the one or more strap stand configurations, the strap provides a strap stand for the mobile electronic device.

2. The accessory of claim 1 further comprising at least one of:
the mobile electronic device; or
the cover mechanism.

3. The accessory of claim 1 wherein:
the one or more support elements comprise two or more support elements; and
the two or more support elements comprise the first support element, a second support element, a third support element, a fourth support element, a fifth support element, a sixth support element, a seventh support element, and an eighth support element.

4. The accessory of claim 3 wherein:
each of the two or more support elements are separated from each other by approximately 9 millimeters.

5. The accessory of claim 1 wherein:
each of the one or more support elements comprises at least one of a support element length of approximately 6 millimeters or a support element width of approximately 37 millimeters.

6. The accessory of claim 1 wherein:
the first stabilization structure further comprises a first stabilization structure first element and a first stabilization structure second element;
the first stabilization structure first element comprises a first stabilization structure aperture configured to receive the first coupling mechanism;
the first stabilization structure first element comprises at least one of (i) a first stabilization structure first element thickness of approximately 1 millimeter or (ii) a polycarbonate material; and
the first stabilization structure second element comprises at least one of (i) a first stabilization structure second element thickness of approximately 0.5 millimeters or (ii) a steel material.

7. The accessory of claim 6 wherein:
the second stabilization structure comprises at least one of (i) a second stabilization structure thickness of approximately 1 millimeter or (ii) the polycarbonate material.

8. The accessory of claim 1 wherein:
the first coupling mechanism comprises a magnet.

9. The accessory of claim 1 wherein:
the first support element comprises a second coupling mechanism configured to be coupled to the first stabilization structure when the strap is positioned in the strap closed configuration to maintain the strap in the strap closed configuration; and
the second coupling mechanism is configured to be at least one of mechanically or magnetically coupled to the first stabilization structure.

10. The accessory of claim 1 wherein:
the cover mechanism comprises a cover mechanism coupling mechanism and at least two cover mechanism panels;
the cover mechanism is configured to be removably coupled to the mobile electronic device exterior at the cover mechanism coupling mechanism;
the at least two cover mechanism panels comprise a first coupling mechanism panel coupled to the cover mechanism coupling mechanism; and
the first coupling mechanism is configured to be coupled to the cover mechanism at the first coupling mechanism panel.

11. The accessory of claim 10 wherein:
when the strap is positioned in the strap closed configuration, the first coupling mechanism is coupled to the cover mechanism at the first cover mechanism panel and the strap wraps around the mobile electronic device such that the first support element is positioned proximate to the first stabilization structure and the first coupling mechanism.

12. The accessory of claim 10 wherein:
when the strap is positioned in the one or more strap stand configurations, the first stabilization structure operates to prevent the at least two cover mechanism panels from deforming, and different ones of the one or more support elements operate to support the mobile electronic device at one or more predetermined viewing angles for each of the one or more strap stand configurations.

13. The accessory of claim 1 wherein:
the strap comprises a strap length of approximately 420 millimeters;
the strap comprises a strap width of approximately 42 millimeters;
the first stabilization structure comprises a first stabilization structure length of approximately 170 millimeters;
the first stabilization structure comprises a first stabilization structure width of approximately 37 millimeters;
the second stabilization structure comprises a second stabilization structure length of approximately 100 millimeters;
the second stabilization structure comprises a second stabilization structure width of approximately 37 millimeters;
the first stabilization structure is separated from the second stabilization structure by approximately 25 millimeters;
the strap further comprises a strap perimeter and a strap perimeter region;
the strap perimeter region separates the first stabilization structure, the second stabilization structure, and the one or more support elements from the strap perimeter by approximately 2.5 millimeters;
the mobile electronic device comprises a tablet computer system;
the cover mechanism comprises a cover mechanism coupling mechanism and four cover mechanism panels;
the first coupling mechanism comprises a first magnet;
the first support element comprises a second coupling mechanism;
the second coupling mechanism comprises a second magnet configured to be coupled to the first magnet when the strap is positioned in the strap closed configuration to maintain the strap in the strap closed configuration;
the first stabilization structure further comprises a first stabilization structure first element and a first stabilization structure second element;
the first stabilization structure first element comprises a first stabilization structure aperture configured to receive the first coupling mechanism;
the first stabilization structure first element comprises a first stabilization structure first element thickness of approximately 1 millimeter and comprises a polycarbonate material;
the first stabilization structure second element comprises a first stabilization structure second element thickness of approximately 0.5 millimeters and comprises a steel material;
the second stabilization structure comprises a second stabilization structure thickness of approximately 1 millimeter and the polycarbonate material; and
each of the one or more support elements comprises a support element length of approximately 6 millimeters and a support element width of approximately 37 millimeters.

14. A method of providing an accessory for a mobile electronic device, the mobile electronic device comprising (a) a mobile electronic device display, (b) a mobile electronic device exterior, and (c) a cover mechanism, and the cover mechanism comprising (x) a cover mechanism closed configuration, (y) being devoid of the mobile electronic device display, and (z) being configured to be coupled to the mobile electronic device exterior and to conceal the mobile electronic device display when the cover mechanism is positioned in the cover mechanism closed configuration, the method comprising:
providing a strap comprising a first stabilization structure, a second stabilization structure, and one or more support elements;
wherein:
providing the strap comprises:
providing the first stabilization structure such that the first stabilization structure comprises a first coupling mechanism configured to be coupled to the cover mechanism in order to couple the strap to the cover mechanism;
providing the one or more support elements such that the one or more support elements comprise a first support element; and
configuring the strap to comprise a strap closed configuration and one or more strap stand configurations such that (i) when the strap is positioned in the strap closed configuration and the cover mechanism is positioned in the cover mechanism closed configuration, the strap is configured to maintain the cover mechanism in the cover mechanism closed configuration and (ii) when the strap is positioned in the one or more strap stand configurations, the strap provides a strap stand for the mobile electronic device.

15. The method of claim 14 further comprising:
providing the mobile electronic device; or
providing the cover mechanism.

16. A method of using an accessory for a mobile electronic device, the mobile electronic device comprising (a) a mobile electronic device display, (b) a mobile electronic device exterior, and (c) a cover mechanism, and the cover mechanism comprising (x) a cover mechanism closed configuration, (y) being devoid of the mobile electronic device display, and (z) being configured to be coupled to the mobile electronic device exterior and to conceal the mobile electronic device display when the cover mechanism is positioned in the cover mechanism closed configuration, the method comprising:

coupling a strap to a cover mechanism of the mobile electronic device, the strap comprising a first stabilization structure, a second stabilization structure, and one or more support elements, wherein (i) the first stabilization structure comprises a first coupling mechanism configured to be coupled to the cover mechanism in order to couple the strap to the cover mechanism, (ii) the one or more support elements comprise a first support element, (iii) the strap comprises a strap closed configuration and one or more strap stand configurations, (iv) when the strap is positioned in the strap closed configuration and the cover mechanism is positioned in the cover mechanism closed configuration, the strap is configured to maintain the cover mechanism in the cover mechanism closed configuration, and (v) when the strap is positioned in the one or more strap stand configurations, the strap provides a strap stand for the mobile electronic device; and positioning the strap in a first strap stand configuration of the one or more strap stand configurations.

17. The method of claim 16 further comprising:
positioning the strap in a second strap stand configuration of the one or more strap stand configurations.

18. The method of claim 16 further comprising:
positioning the strap in the strap closed configuration.

19. The method of claim 16 further comprising:
operating the mobile electronic device while the strap is in the first strap stand configuration.

20. The method of claim 16 further comprising:
decoupling the strap from the cover mechanism of the mobile electronic device.

* * * * *